United States Patent
Georgiev

(10) Patent No.: US 9,921,773 B2
(45) Date of Patent: Mar. 20, 2018

(54) RANGE-BASED DATA DEDUPLICATION USING A HASH TABLE WITH ENTRIES REPLACED BASED ON ADDRESS ALIGNMENT INFORMATION

(71) Applicant: Citrix Systems, Inc., Fort Lauderdale, FL (US)

(72) Inventor: Ivan Georgiev, Sofia (BG)

(73) Assignee: Citrix Systems, Inc., Fort Lauderdale, FL (US)

( * ) Notice: Subject to any disclaimer, the term of this patent is extended or adjusted under 35 U.S.C. 154(b) by 98 days.

(21) Appl. No.: 14/743,520

(22) Filed: Jun. 18, 2015

(65) Prior Publication Data
US 2015/0370495 A1 Dec. 24, 2015

Related U.S. Application Data

(60) Provisional application No. 62/013,739, filed on Jun. 18, 2014.

(51) Int. Cl.
*G06F 3/06* (2006.01)
*G06F 17/30* (2006.01)

(52) U.S. Cl.
CPC ............ *G06F 3/0641* (2013.01); *G06F 3/067* (2013.01); *G06F 3/0608* (2013.01); *G06F 3/0611* (2013.01); *G06F 17/30156* (2013.01)

(58) Field of Classification Search
CPC .... G06F 3/0619; G06F 3/0689; G06F 3/0665; G06F 3/0641; G06F 3/067; G06F 3/0611; G06F 3/0608; G06F 17/30156
See application file for complete search history.

(56) References Cited

U.S. PATENT DOCUMENTS 7,409,526 B1    8/2008  Ng et al.
8,538,933 B1    9/2013  Hu et al.
(Continued)

OTHER PUBLICATIONS

Written Opinion of the International Searching Authority for International Application No. PCT/US2015/036463, dated Dec. 23, 2015, downloaded from WIPO Patentscope, 8 pages.*

(Continued)

*Primary Examiner* — Tuan Thai
*Assistant Examiner* — Glenn Gossage
(74) *Attorney, Agent, or Firm* — BainwoodHuang

(57) ABSTRACT

Deduplicated data storage is provided by presenting a virtual volume mapped by a translation table to a physical volume of a physical data storage system. The translation table maps sets of ranges of duplicate data blocks of the virtual volume to corresponding individual ranges of shared data blocks of the physical volume. A hash table for identifying duplicate data is indexed by a portion of a hash value calculated from newly written data blocks, and has entries each identifying an address alignment of the corresponding data block. In operation, existing entries are replaced with new entries for colliding data blocks having better address alignment, promoting wider address-space separation of the entries. Upon occurrence of a hit in the hash table, for a given data block in a range of newly written data blocks, data blocks of the range are compared to corresponding blocks in a range identified by the hit to maximize a size of a region to be identified by the translation table as duplicate data.

27 Claims, 8 Drawing Sheets

(56) References Cited

U.S. PATENT DOCUMENTS

| | | | |
|---|---|---|---|
| 8,732,411 B1 | 5/2014 | Chatterjee et al. | |
| 8,751,763 B1* | 6/2014 | Ramarao | G06F 17/30159 |
| | | | 711/162 |
| 9,772,789 B1* | 9/2017 | Natanzon | G06F 3/064 |
| 2012/0084269 A1* | 4/2012 | Vijayan | G06F 3/0652 |
| | | | 707/692 |
| 2012/0226672 A1* | 9/2012 | Hayashi | G06F 3/0608 |
| | | | 707/698 |
| 2013/0086006 A1* | 4/2013 | Colgrove | G06F 3/0688 |
| | | | 707/692 |
| 2014/0188822 A1* | 7/2014 | Das | H03M 7/30 |
| | | | 707/693 |

OTHER PUBLICATIONS

International Search Report for International Application No. PCT/US2015/036463 dated Sep. 29, 2015 from the International Searching Authority, 5 pages.

\* cited by examiner

| | RANGE 74 | | TYPE 76 | REF CNT 78 | F<sub>Δ</sub> 80 |
|---|---|---|---|---|---|
| 72-1 | SA1 | EA1 | DS | 2 | - |
| 72-2 | SA2 | EA2 | DD | 5 | F<sub>Δ</sub> 2 |
| | . | . | . | . | . |
| | . | . | . | . | . |
| | . | . | . | . | . |
| 72-n | SAn | EAn | DU | - | - |

Fig. 6    ← 70

RANGE-BASED DATA DEDUPLICATION USING A HASH TABLE WITH ENTRIES REPLACED BASED ON ADDRESS ALIGNMENT INFORMATION

SUMMARY

The present invention is related to the field of deduplicated data storage.

Data deduplication is a technique used to increase efficient use of available data storage space. Duplicate copies of data are replaced with pointers to single shared instances of the data. Data deduplication has been used in different contexts or functional areas of computer systems, e.g. in file systems, block-based data storage systems, etc.

A method is disclosed of operating a host computer in conjunction with a physical data storage system to provide deduplicated persistent data storage to a higher-level service, such as a file system. The method includes presenting a virtual volume to the service for storage of service data, where the virtual volume is mapped by a translation table to a physical volume of the physical data storage system and the physical volume has a size expressed as a number of fixed-size data blocks. The translation table maps sets of ranges of duplicate data blocks of the virtual volume to corresponding individual ranges of shared data blocks of the physical volume, and the mapping is used to access ranges of the shared data blocks to complete service operations directed to corresponding ranges of the duplicate data blocks.

A hash table is used to track contents of the physical volume and identify newly written data as duplicate data to be mapped by the translation table to corresponding shared data blocks of the physical volume. The hash table is indexed by a portion of a fixed-size hash value calculated from newly written data blocks, and has a number of entries substantially less than the number of data blocks of the physical volume. Each hash table entry identifies an address alignment of the data block from which the entry was created. The use of the hash table includes (1) replacing existing entries with respective new entries for colliding data blocks having better address alignment, thereby promoting wider address-space separation of the entries, and (2) upon occurrence of a hit in the hash table for a given data block in a range of newly written data blocks, comparing the data blocks of the range to corresponding data blocks in a range identified by the hit to maximize a size of a corresponding region to be identified by the translation table as duplicate data.

Key aspects of the disclosed technique include range-based identification of duplicate data, which can promote efficient operation by avoiding a need for block-by-block translations when performing storage I/O operations. Efficiency is promoted by use of a relatively small hash table and the technique of replacing entries based partly on address alignment, promoting the coverage of larger ranges by single hash table entries. The disclosed technique may be particularly effective in systems storing large numbers of similar containerized structures such as virtual machines.

In some embodiments, the mapping is used to divide an I/O request into multiple sub-requests for corresponding sub-regions of data, where the I/O request spans distinct ranges of the virtual volume having respective distinct mappings to the physical volume, the I/O request being divided such that the sub-requests are directed to respective ones of the distinct ranges.

In some embodiments, the translation table includes entries for respective ranges, each entry having data distributed among a set of fields including a range field storing starting and ending addresses of the respective range. A type field stores a duplication type of the respective range; a reference count field stores a count of duplications of the respective range; and a mapping field stores a respective mapping between the virtual volume and the physical volume for the respective range. An entry is identified as being involved in an I/O request by comparing contents of the range field against starting and ending addresses of the I/O request, overlap indicating that the corresponding region is involved in the I/O request.

In some embodiments, regions of the virtual volume are identified as respective types including deduplication source (DS) regions, deduplicated (DD) regions, moved (DM) regions, and unknown (DU) regions, the DS regions containing original or first instance data, the DD regions (a) containing data for which identical data has been found in another region and (b) being translated and having respective freed physical-volume space assigned to extend a size of the virtual volume, the DM regions being translated, and the DU regions being untranslated regions. The method may further include region-type-dependent data writing operations including a DS region overwrite and a DD region overwrite. The DS region overwrite may include (a) initially checking whether a DS region being written to has previously been translated, (b) if the DS region has not previously been translated, then identifying a free space region and translating the DS region to the free space region, and (c) if the DS region has previously been translated, then writing to the DS region without translating the DS region. The DD region overwrite may include (a) identifying a free space region irrespective of previous translation of the DD region, (b) translating the DD region to the free space region, and (c) changing the type of the DD region to DM.

In some embodiments, the method may further include, when a certain amount of duplicate data has been found and deduplicated, extending a size of the virtual volume by appending free regions corresponding to regions of the physical volume that are unused by virtue of deduplication of the duplicate data.

In some embodiments, the portion of the hash value that indexes the hash table is a first portion, and a remainder portion of the hash value is stored in a remainder portion field of each entry to provide full-width comparison of the hash value to the entries.

In some embodiments, a size of the hash table measured as number of entries is less than $1/100$ a size of the physical volume measured in data blocks. In one particular embodiment, the number of entries is about $1/1000$ the physical volume size.

In some embodiments, the entries of the hash table have values used in an evaluation operation used to replace existing entries with new entries, the values including (1) a first value reflecting recent usefulness of the entries for detecting duplicates, (2) a second value reflecting address alignment of the entries, and (3) a third value reflecting aging of entries in the hash table, and the evaluation operation includes calculating and comparing respective evaluation values for the existing and new entries and replacing an existing entry having a higher evaluation value. In some embodiments, (1) the first value is a count of hits identifying duplicate data based on an entry, (2) the second value is an offset address for the data block corresponding to the entry, and (3) the third value is a time value incremented when a predetermined number of writes have not resulted in replacing entries of the hash table with new entries.

In some embodiments, upon detection of a duplicate data block being written to the virtual volume, a process of extending a range of blocks including the duplicate data block is performed to maximize a size of the range for identification as a duplicate range. The process may include (a) a search for adjacent duplicate data blocks for data blocks written immediately prior to the writing of the duplicate data block and not previously identified as duplicates based on the contents of the hash table, and (b) a comparison of subsequently written adjacent data blocks with corresponding existing data blocks to detect duplication without first using the hash table to identify potential hits. The comparison may further result in detecting non-duplicate new data blocks and processing the non-duplicate new data blocks to create one or more new entries in the hash table distinct from an existing entry for the duplicate data block.

In some embodiments, respective copies of the hash table are maintained in volatile memory and in persistent storage, and the method further includes periodically synchronizing the two copies, the synchronizing including merging into both copies new entries having better evaluation according to an evaluation operation, the evaluation operation including factors for address alignment and age of the respective entries, the hash table being divided into sections and synchronization being performed one section at a time, synchronization including evaluating respective entries and keeping the entries with greater evaluation in both copies.

In another respect, a host computer is disclosed that includes memory, one or more processors coupled to the memory, and input/output interface circuitry coupled to the memory and processors and used to couple the host computer to a physical data storage system. The memory stores computer program instructions of a software-defined storage layer co-operating with the physical data storage system to provide deduplicated persistent data storage to a higher-level service of the host computer. A virtual volume is presented to the service for storage of service data, the virtual volume being mapped by a translation table to a physical volume of the physical data storage system, the physical volume having a size expressed as a number of fixed-size data blocks, the translation table mapping sets of ranges of duplicate data blocks of the virtual volume to corresponding individual ranges of shared data blocks of the physical volume, the mapping being used to access ranges of the shared data blocks to complete service operations directed to corresponding ranges of the duplicate data blocks. A hash table is used to track contents of the physical volume and identify newly written data as duplicate data to be mapped by the translation table to corresponding shared data blocks of the physical volume, the hash table being indexed by a portion of a fixed-size hash value calculated from newly written data blocks and having a number of entries substantially less than the number of data blocks of the physical volume, each entry identifying an address alignment of the data block from which the entry was created, the use of the hash table including (1) replacing existing entries with respective new entries for colliding data blocks having better address alignment, thereby promoting wider address-space separation of the entries, and (2) upon occurrence of a hit in the hash table for a given data block in a range of newly written data blocks, comparing the data blocks of the range to corresponding data blocks in a range identified by the hit to maximize a size of a corresponding region to be identified by the translation table as duplicate data.

In some embodiments, the host computer may include other features similar to those of the disclosed methods as described above.

In another respect, also disclosed is a non-transitory computer-readable storage medium storing computer program instructions executable by a host computer to cause the host computer to operate in conjunction with a physical data storage system to provide deduplicated persistent data storage to a higher-level service. A virtual volume is presented to the service for storage of service data, the virtual volume being mapped by a translation table to a physical volume of the physical data storage system, the physical volume having a size expressed as a number of fixed-size data blocks, the translation table mapping sets of ranges of duplicate data blocks of the virtual volume to corresponding individual ranges of shared data blocks of the physical volume, the mapping being used to access ranges of the shared data blocks to complete service operations directed to corresponding ranges of the duplicate data blocks. A hash table is used to track contents of the physical volume and identify newly written data as duplicate data to be mapped by the translation table to corresponding shared data blocks of the physical volume, the hash table being indexed by a portion of a fixed-size hash value calculated from newly written data blocks and having a number of entries substantially less than the number of data blocks of the physical volume, each entry identifying an address alignment of the data block from which the entry was created, the use of the hash table including (1) replacing existing entries with respective new entries for colliding data blocks having better address alignment, thereby promoting wider address-space separation of the entries, and (2) upon occurrence of a hit in the hash table for a given data block in a range of newly written data blocks, comparing the data blocks of the range to corresponding data blocks in a range identified by the hit to maximize a size of a corresponding region to be identified by the translation table as duplicate data.

In some embodiments, the computer-readable storage medium may include instructions for other features similar to those of the disclosed methods as described above.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 6 is a schematic diagram of a deduplication translation table;

DETAILED DESCRIPTION

Figure 1:
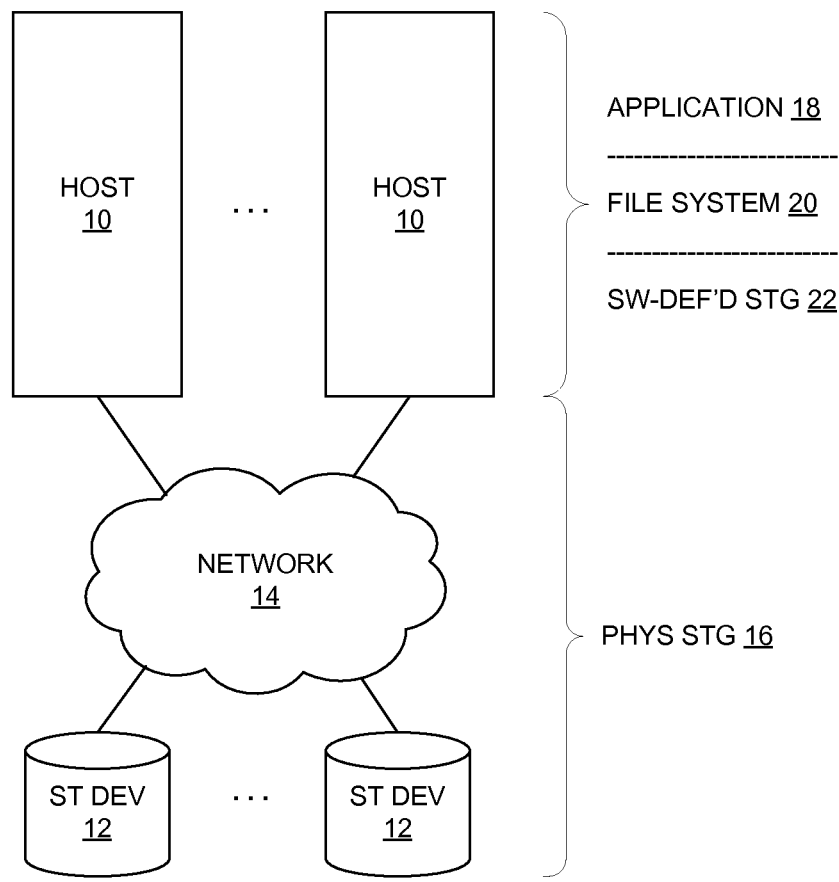
FIG. 1 is a block diagram of a computer system.

FIG. 1 shows a distributed computer system having host computers (HOST) 10 coupled to storage devices (ST DEV) 12 by a network 14. The storage devices 12 may be any of a variety of types, ranging from relatively low-end network-attached storage (NAS) systems to high-end, enterprise-class storage arrays. They may include conventional magnetic disks and/or nonvolatile semiconductor storage such as Flash memory. The network 14 may include local-area networks (LANs) and wide-area network (WANs). The network 14 may employ general-purpose standards and components such as Ethernet and TCP/IP along with a layered storage protocol such as iSCSI, for example, and/or it may employ one or more specialized storage area networks (SANs) using specialized storage interconnect such as FibreChannel. The hosts 10 are typically server-type computers as generally known in the art.

At the right in FIG. 1 is a schematic depiction of operational and structural layers of the system. The network 14 and storage devices 12 make up a physical storage (PHYS STG) layer 16 providing persistent physical storage for data. Within the hosts 10 are an application layer 18, a file system layer 20, and a software-defined storage (SW-DEF'D STG) layer 22. At the application layer 18, each host 10 executes one or more application programs providing services to users, e.g., a database application, banking or other financial application, computer modeling application, etc. At the file system layer 20, the hosts 10 execute one or more file systems that provide a translation between a file paradigm provided to the applications and a device or volume paradigm provided by the software-defined storage layer 22.

In one embodiment, the hosts 10 are coupled together in a computing cluster to provide features such as workload sharing, redundancy in the form of failover, etc. In this case the file system layer 20 may include a global distributed file system, such as a cluster file system, shared by the hosts 10. The software-defined storage layer 22 provides an I/O interface to secondary storage for the file system(s) and application(s) and relies on the resources of the physical storage layer 16 to provide underlying physical storage. Logical or virtual units of storage and related services can be defined within the software-defined storage layer 22 with great flexibility. One such service is data deduplication, i.e., the consolidation of data by replacing redundant copies of data with pointers to shared instances of the data. Various specific aspects of data deduplication provided by the software-defined storage layer 22 are described below.

Figure 2:
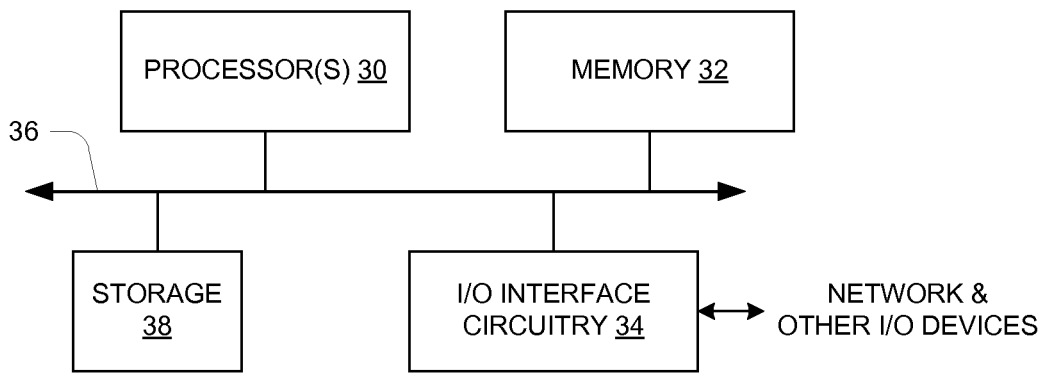
FIG. 2 is a block diagram of a computer from a primarily hardware perspective.

FIG. 2 shows an example configuration of a physical computer such as a host 10 (FIG. 1) from a computer hardware perspective. The hardware includes one or more processors 30, memory 32, and I/O interface circuitry 34 interconnected by data interconnections 36 such as one or more high-speed data buses. The interface circuitry 34 provides a hardware connection to the network 14 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a data deduplication application, for example, can be referred to as a data deduplication circuit or data deduplication component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
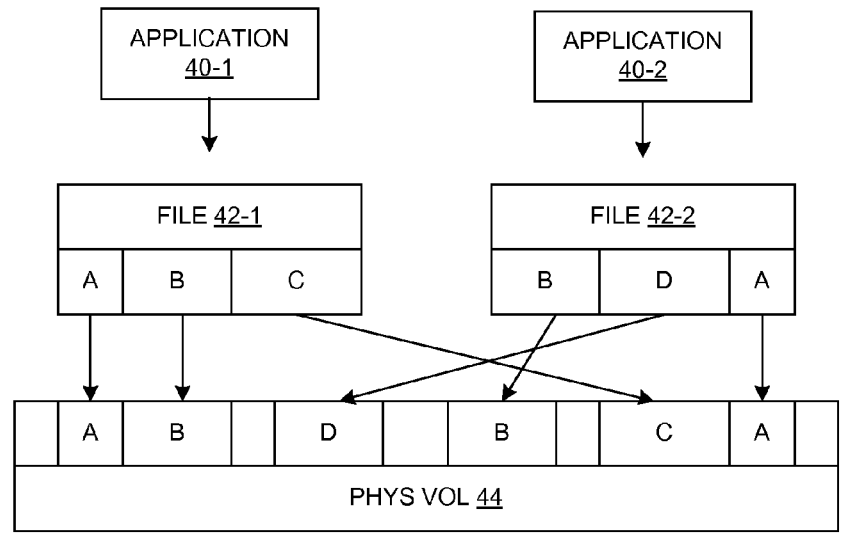
FIG. 3 is a schematic depiction of data duplication in a conventional system that does not employ data deduplication.

FIG. 3 depicts operation of a conventional system that does not employ data deduplication. As shown, two applications 40-1, 40-2 utilize respective files 42-1, 42-2, with the file 42-1 including data regions A, B and C and the file 42-2 including data regions B, D and A. Each of these regions has specific underlying storage on a physical volume 44, with a file system (not shown) being responsible for the generally arbitrary mapping between the linearly arranged regions of the files 42 and the corresponding regions of the physical volume 44. Generally speaking, neither applications nor conventional file systems have awareness of duplication of data, and thus there is the possibility of duplicate copies of data units being stored on the physical volume 44. In this example, data regions A and B are duplicated. This of course represents inefficiency in the use of the physical storage space. In some systems, notably those providing support for virtual machines or other containerized structures, there may be extensive duplication of data that could result in considerable storage inefficiency if a conventional approach such as that of FIG. 3 is used.

Figure 4:
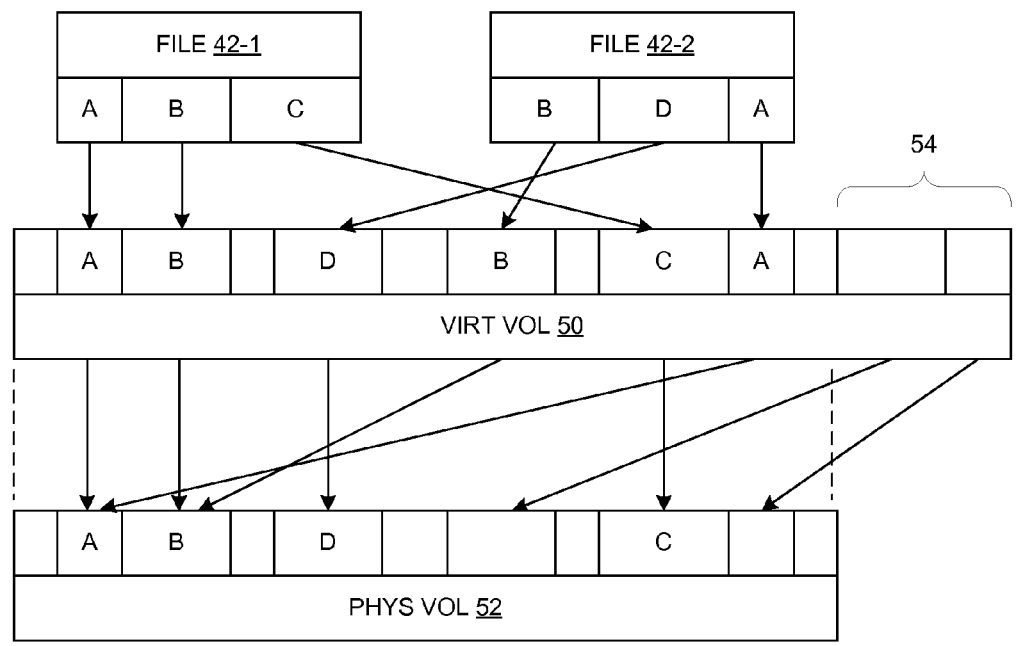
FIG. 4 is a schematic depiction of deduplicated data.

FIG. 4 shows an alternative arrangement employing data deduplication to achieve greater storage efficiency. A virtual storage device or volume (VIRT VOL) 50 is presented to the file system, and duplicate data are detected and mapped to locations of shared data on a physical volume (PHYS VOL) 52. This reduces the amount of physical storage space required to support a virtual volume 50 of a given size. In the illustrated example, duplicate copies of blocks A and B of the virtual volume 50 are realized by respective pointers to a single shared instance of each of A and B. The physical regions that would otherwise have been used to store the duplicate regions A and B can be used to store other data. Such space is made available by reporting a correspondingly larger virtual volume size. In this example, the two pairs of duplicate data regions are consolidated into single shared regions A, B on the physical volume 52, and the reclaimed free space is presented to the file system as an extension 54 of the size of the virtual volume 50.

To provide deduplication such as depicted in FIG. 4, the software-defined storage layer 22 (FIG. 1) includes deduplication logic, also referred to as a "deduplicator", attached to storage-facing endpoints of the file system layer 20 (FIG. 1) which handle application (user) data reading and writing (I/O) operations. The virtual data space which is presented to the file system layer 20 is mapped by the deduplicator in a translation map, an example of which is described below. Deduplication is region-based, i.e., performed for generally arbitrary-size contiguous units of storage referred to herein as "regions" and having respective start and end addresses (or offsets). For each region, the deduplicator implements a discrete translation $F_A\{[x, y]\} \rightarrow [x+F_A, y+F_A)$, $F_A \in \mathbb{Z}$, where [x, y) is a pair denoting a region's start and end offsets on the virtual volume 50, and [x+$F_A$, y+$F_A$) are the translated data region's starting and ending addresses on the physical volume 52. Note that the translation does not change the regions' sizes. Some or many regions of the virtual volume 50 are not translated, and for them $F_A$=0.

When the file system services an application I/O request, it delegates the request to the deduplicator. The deduplicator divides the I/O request into portions depending on a translation map and applies respective $F_A$ to the offset of each portion. The I/O request portions are then delegated to the physical storage layer 16 (FIG. 1) and physical volume 52, where the actual region locations may differ from the locations of the regions on the virtual volume 50.

Figure 5:
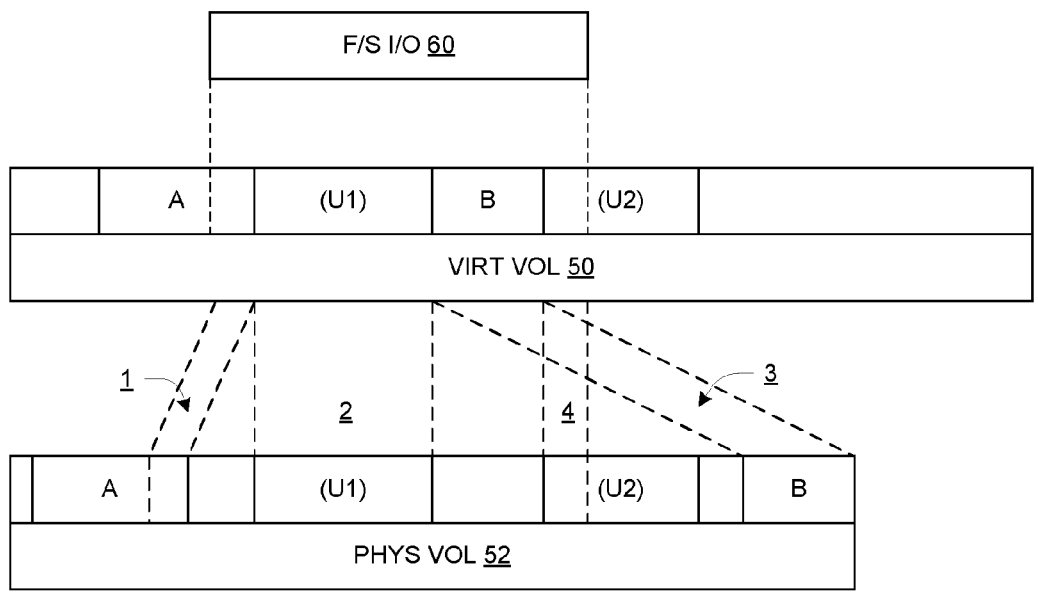
FIG. 5 is a schematic depiction of an I/O operation spanning multiple distinct regions.

FIG. 5 shows an illustrative example in which a file system I/O request (F/S I/O) 60 overlaps two translated regions A and B of the virtual volume 50, as well as regions U1 and U2 that are not translated. In this case the I/O request is split into four portions 1-4 as shown, corresponding to the four discrete and non-adjacent regions of the physical volume 52. The four portions are separately processed at the physical storage layer 16 using their respective $F_A$ values.

Region Types

Each region of the virtual volume 50 can be one of the following types:
- DS—deduplication source regions, containing the "original" (first instance) data of one or more deduplicated regions.
- DD—deduplicated regions, for which identical data has been found in another region. These regions have been translated and the space has been used to extend the virtual volume 50.
- DM—moved regions, for which $F_A\{[x, y]\} \rightarrow [x+F_A, y+F_A)$, $F_A \neq 0$.
- DU—unknown (untranslated) regions, for which no data is kept and thus by default action $F_A$=0.

Referring back to the example of FIG. 4, the leftmost regions A and B of the virtual volume 50 are of type DS, while the rightmost regions B and A are of type DD. The regions D and C are of type DM.

FIG. 6 shows the structure of a deduplication translation table 70 that is used by the deduplicator to manage the translations between the virtual volume 50 and the physical volume 52. The translation table 70 includes entries 72 (72-1, 72-2, . . . , 72-n) each of which has data distributed among a set of fields. The fields include a range 74 having a starting address (SA) and ending address (EA), a type 76, a reference count 78, and a translation or mapping field 80. The reference count 78 identifies the number of duplicated virtual-volume ranges that map to a shared physical range. In operation, the deduplicator accesses the entries 72 for all regions involved in an I/O operation, and uses the contents to perform the required translation. Entries 72 are identified by comparing the contents of their range field 74 against the SA and EA of the I/O request. Any overlap implies that the corresponding region is involved in the I/O request. It may be advantageous to arrange the entries 72 in address order for coherency and efficiency.

Region Reading Action

The behavior of the deduplicator is the same for all region types when servicing file system read I/O operations. The translation table 70 is used to divide the I/O into portions as necessary, the $F_A$ values are used to translate addresses as necessary, and the data is read from the respective regions of the physical volume 52.

Region Writing Action

The behavior of the deduplicator for file system write I/O operations varies by region depending on the type of the region, as follows.

1. DS Region Overwrite Action

Before overwriting a DS region, the deduplicator checks if $F_A$=0, i.e., whether the region has previously been translated. If not, the deduplicator requests a free space region from the file system and translates the DS region to the free space region. After such a translation for a DS region occurs, it can be overwritten at will, because the underlying storage is now separate from the original shared region that continues to be referenced by one or more DD regions.

Figure 7:
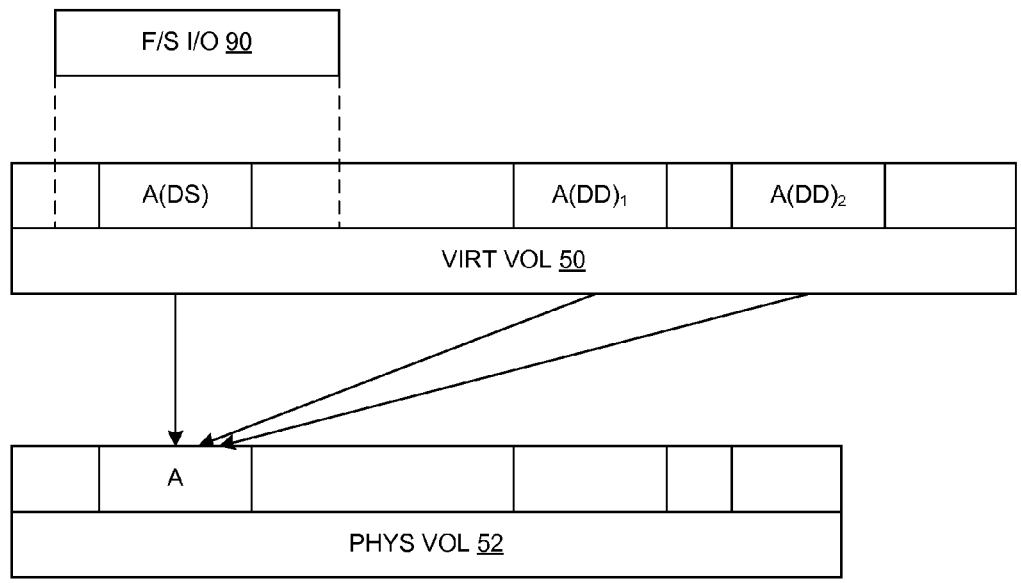
FIGS. 7 and 8 depict a file system write I/O operation involving a deduplication source (DS) region.
Figure 8:
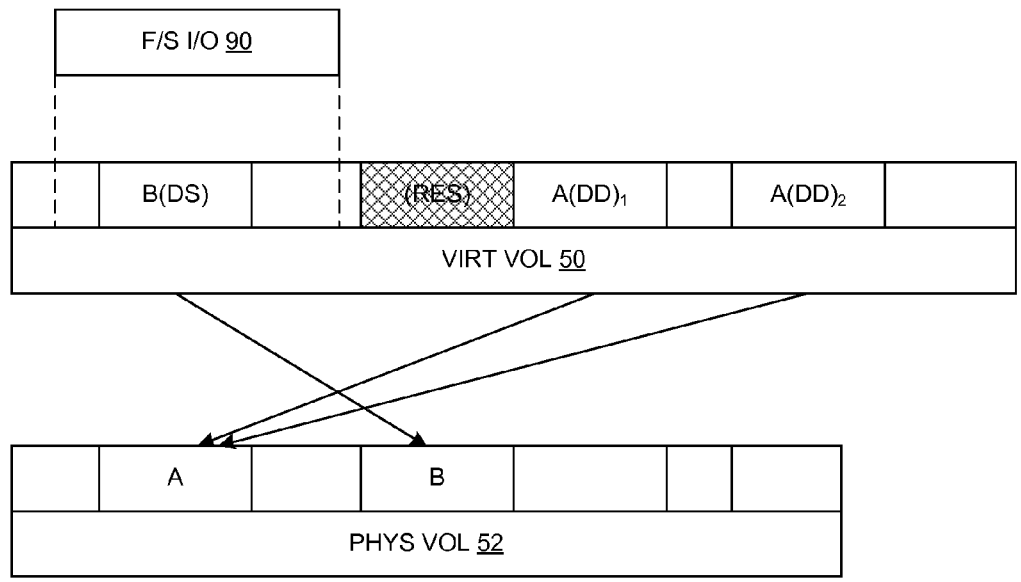

FIGS. 7 and 8 provide an example of the above, with a file system write I/O operation 90 involving a region A of type DS shown as A(DS). FIG. 7 shows the initial condition with the physical-volume region A shared by three virtual-volume regions A(DS), A(DD)$_1$ and A(DD)$_2$. In FIG. 8, A(DS) has been overwritten by new data B, which is given type DS and which maps to a new location on the physical volume 52. Note that the corresponding region of the virtual volume 50 is marked as "reserved" (RES).

2. DD Region Overwrite Action

When overwriting a DD region, the deduplicator unconditionally requests a free space region from the file system and redirects the DD region to the reserved space. It then changes the region type to DM.

Figure 9:
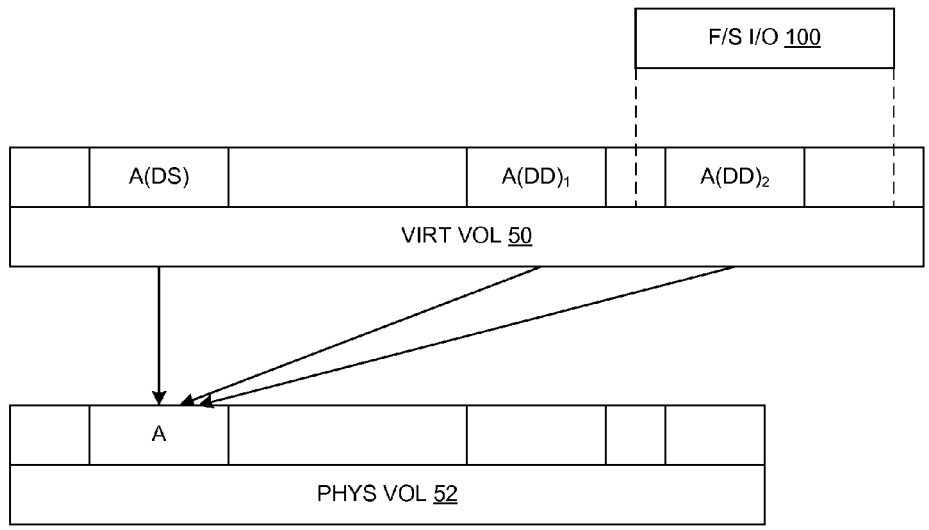
FIGS. 9 and 10 depict a file system write I/O operation involving a deduplicated (DD) region.
Figure 10:
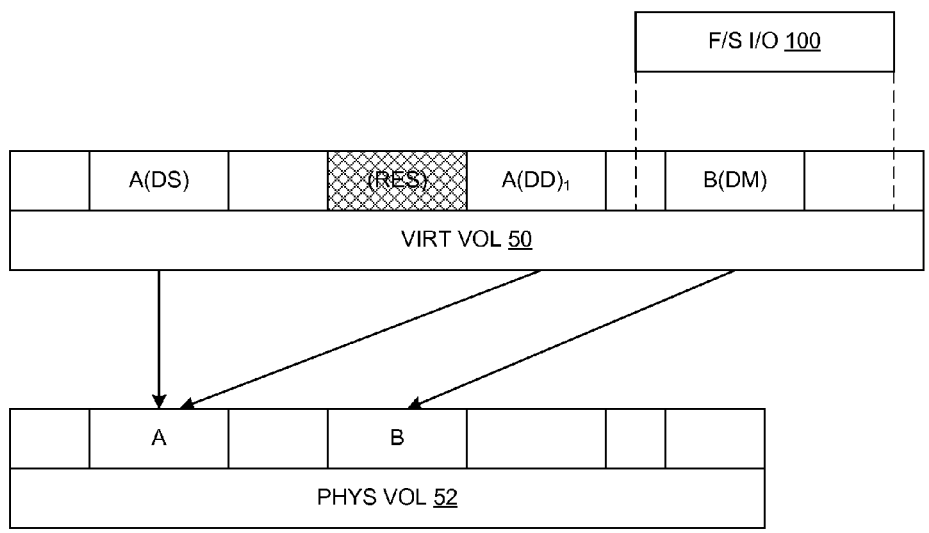

FIGS. 9 and 10 provide an example of the above, with a file system write I/O operation 100 involving region A(DD)$_2$. FIG. 9 shows the initial condition with the physical-volume region A shared by three virtual-volume regions A(DS), A(DD)$_1$ and A(DD)$_2$. In FIG. 10, A(DD)$_2$ has been overwritten by B, which is given type DM and which maps to a new location on the physical volume 52. Note that the corresponding region of the virtual volume 50 is marked as "reserved" (RES).

Recycling Deduplicated Space

When a certain amount of duplicate data has been found and deduplicated, the deduplicator appends DM regions to the end of the virtual volume 50. The number and size of these new regions is equal to the number and size of the previously discovered DD regions. Then the deduplicator informs the file system that the size of the virtual volume 50 has been increased. The file system adds the newly discovered space to its free space pool, from which it can be allocated for use in storing file system data, including user data and/or meta-data.

Figure 11:
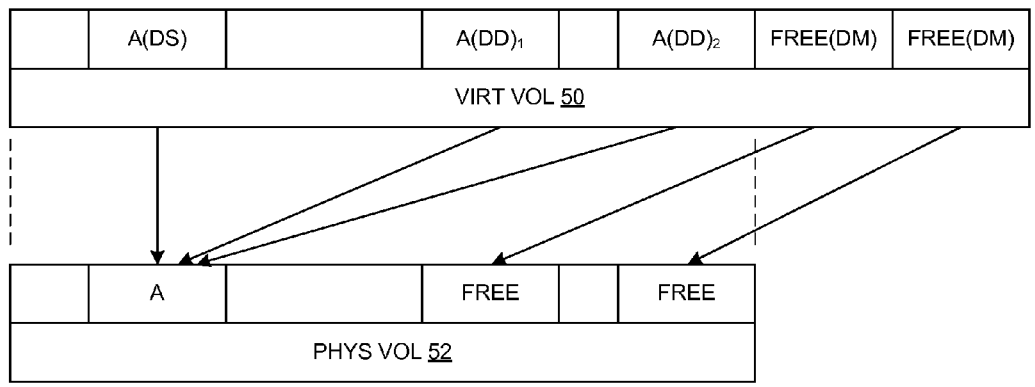
FIG. 11 is a schematic depiction of additional of free space to a virtual volume.

FIG. 11 shows an example of the above. Two duplicate regions A(DD)$_1$ and A(DD)$_2$ have been identified, so corresponding new free regions FREE(DM) are added to the end of the virtual volume 50. These map to corresponding FREE regions of the physical volume 52.

Discovering Data Duplicates

Figure 12:
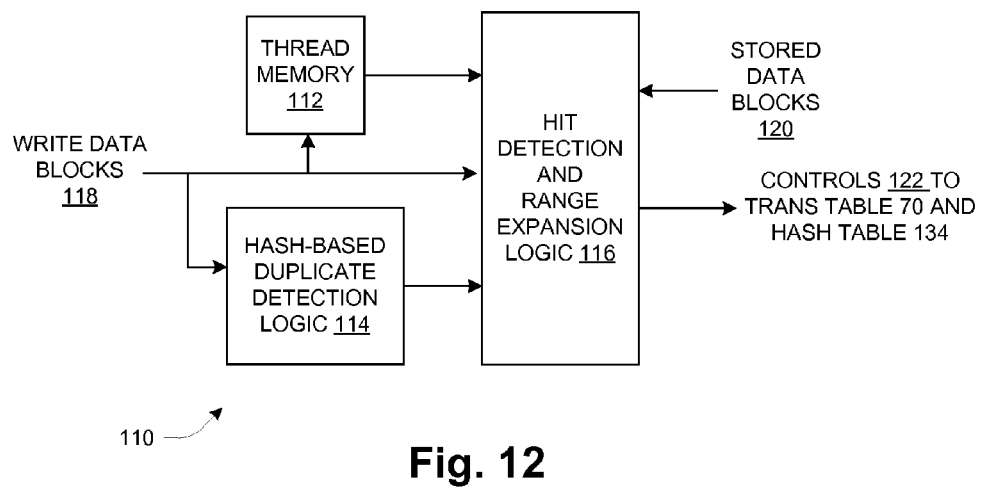
FIG. 12 is a block diagram of a deduplicator.

FIG. 12 is a block diagram of a deduplicator 110 within the software-defined storage layer 22. It includes a thread memory 112, hash-based duplicate detection logic 114, and hit detection and range expansion logic 116. The thread memory 112 stores, for different I/O streams or "threads", the location of the last de-duplicated write and its $F_A$. The hit detection and range expansion logic 116 performs two interrelated functions. A first function is initial detection of a duplicate block based on the output of the hash-based duplicate detection logic 114 as well as direct comparison of a newly written block 118 with and the existing data block for an existing hash table entry. For this purpose the hit detection and range expansion logic 116 can perform read operations and retrieve stored data blocks 120 from a storage device 12 (FIG. 1) or a cache. The second function is expanding the range of data blocks identified as duplicate when a duplicate is detected by the hash-based duplicate detection logic 114, which employs information from the thread memory 112. Both these functions are described more below. The hit detection and range expansion logic 116 generates controls 122 for the translation table 70 as well as a hash table 134 described below.

Figures 13, 14:
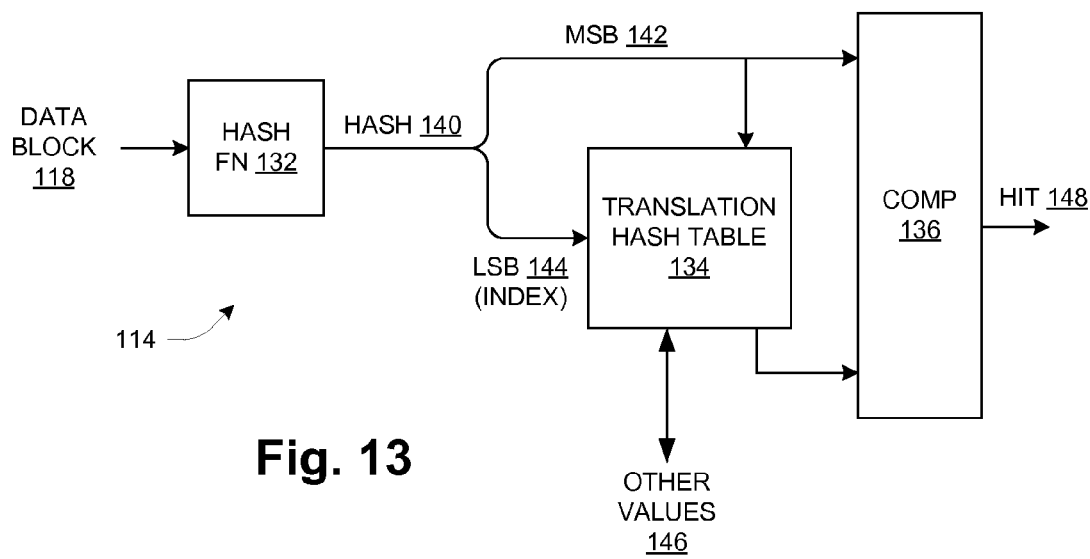
FIG. 13 is a block diagram of hash-based duplicate detection logic.
FIG. 14 is a schematic diagram of a hash table.

FIG. 13 shows hash-based duplicate detection logic 114 used to detect duplicate data blocks so that corresponding ranges can be assigned DD type and respective translation functions $F_A$. This logic is part of the deduplicator within the software-defined storage layer 22. The primary components are a hash function 132, translation hash table 134, and comparison logic (COMP) 136. This logic is used as data blocks 118 are being written as part of a write I/O operation.

The hash function 132 calculates a hash value or checksum (HASH) 140 that functions as an identifier for a data block 118. In one example the hash function 132 may be a CRC32 checksum calculator. The hash 140 is divided into upper bits (MSB 142) and lower bits (LSB 144). In one example, the MSB 142 and LSB 144 both have a size of 16 bits. The LSB 144 serves as the index into the hash table 134, and thus the size of the LSB 144 in bits is $\log_2$ the size (number of entries) of the hash table 134. In one design approach, the size of the hash table 134 may first be selected, which dictates the size of LSB 144, and then the remaining uppermost bits make up the MSB 142. The size of the table 134 is generally dependent on the size of the physical volume 52, e.g., the number of entries is some fraction of the number of data blocks that make up the physical volume 52, generally a fraction less than $\frac{1}{100}$. In one example, the table size (number of entries) is about $\frac{1}{1000}$ of the volume size in data blocks. The hash table 134 may also be logically divided into several equal-size parts for better performance when doing synchronization, described below.

The hash table 134 stores entries for data blocks previously written at locations corresponding to the LSB 144 of the respective hashes 140 of those blocks, and each entry stores the MSB 142 of the hash 140 along with other values 146. This structure is described more below. During a write, the LSB 144 is used to retrieve a corresponding entry, and the stored MSB value of the entry is compared with the MSB 142 by the comparison logic 136. If the values match, then a conditional hit 148 is generated. The hit is conditional because of the possibility of aliases, which are ruled out by subsequently comparing the actual data blocks for verification. A verified hit results in declaring the data block 118 a duplicate, which eventually leads to creation of a range of type DD as more fully described below.

FIG. 14 illustrates the structure of the hash table 134. It includes a number of entries 150 (150-1, 150-2, . . . , 150-m), with each entry 150 having respective values in an MSB field 152, offset field 154, time field 156 and hits field 158. Also shown in hexadecimal notation is an address or index 160, which as indicated above is the LSB 144 of the hash value 140. New entries are added based on an evaluation that occurs at the time of a collision, as described more below.

The MSB field 152 for each entry stores the MSB 142 of the hash 140 for which the entry was created, and the stored MSB value is used in identifying hits, as described above. The offset field 154 for an entry stores the block address of that data block on the physical volume 52. The offset value indicates address alignment of the data block, which is relevant to the quality of the entry and thus used in evaluation as described below. The time field 156 stores a value used for aging entries, and is also used for evaluation. The time field 156 is not a conventional clock time, but rather it is a variable that is incremented for all entries 150 when some number of blocks 118 have been written without any new entries 150 having been added to the hash table 134. The time value thus reflects some period of use of a given contents of the hash table 134, during which period the contents "age" and generally become less useful. The hits field 158 for each entry 150 identifies the number of times this entry has caused detection of a duplicate block. This value is also used for evaluation, as it indicates the quality of the entry in terms of its recent usefulness in detecting duplicates.

Efficiency is promoted by structuring the hash table 134 to be indexed by part of the hash 140 and to store the remainder. There is a tradeoff between the size of this table and performance in terms of its ability to distinguish different data blocks without requiring access to the data blocks. At one extreme a table could have a size equal to the size of the hash value 140, e.g., $2^{32}$ entries for a 32-bit hash. Such a table might have lower average usefulness of the entries. Efficiency can be enhanced by making the table smaller and including non-index bits of the hash in the entries, so that a full-width comparison (e.g., all 32 bits of 32-bit CRC) can still be made. The entries will have higher average activity. In any particular embodiment, the sizes of the index portion and stored portion can be chosen to desirably balance storage efficiency and performance.

Figure 15:
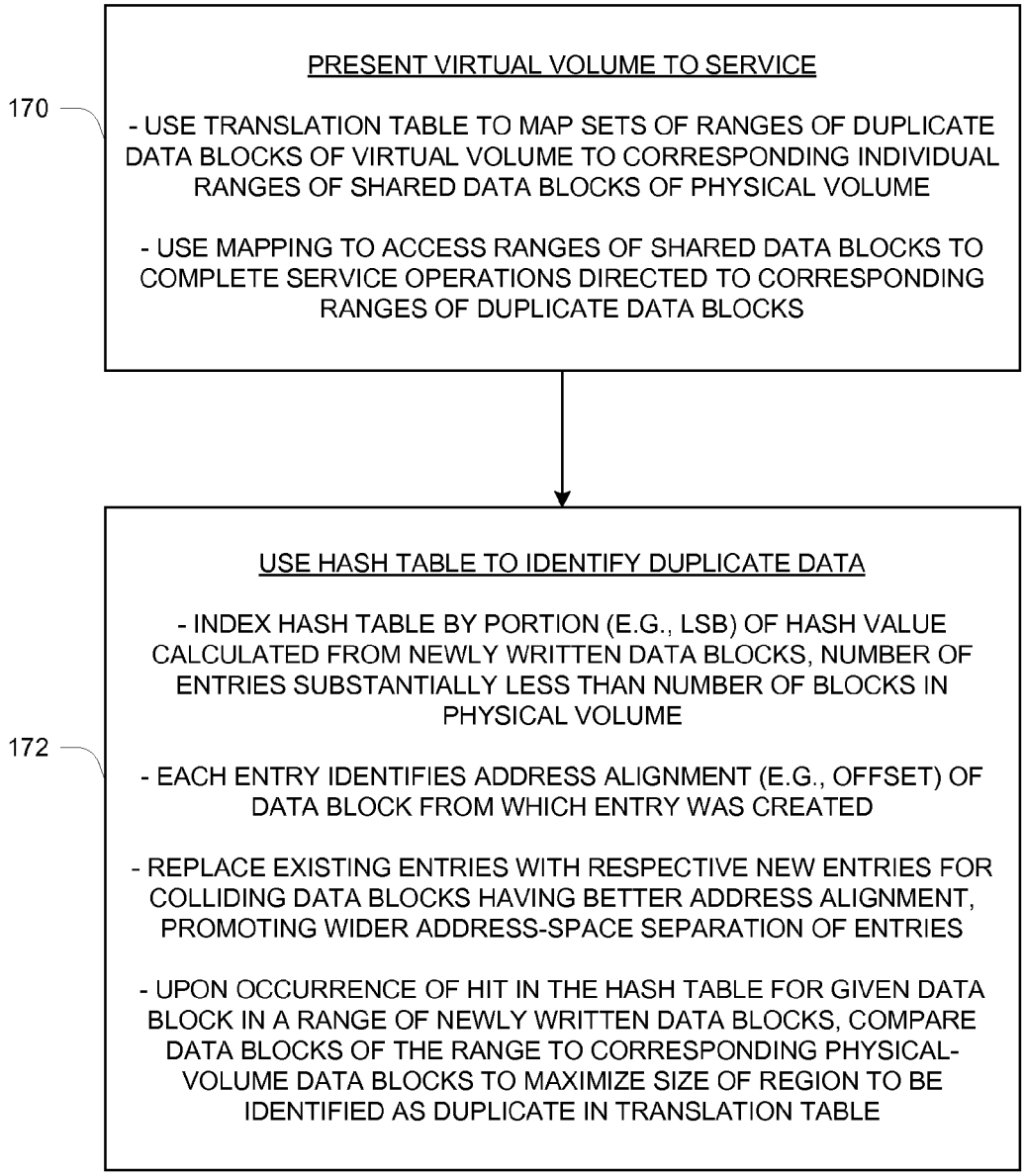
FIG. 15 is a high-level flow diagram of operation of a software-defined storage layer providing deduplicated data storage to a higher-level service such as a file system.

FIG. 15 shows the high-level flow of operation of software-defined storage layer 22 providing deduplicated persistent data storage to a higher-level service, of which a file system 20 is an example. Other examples include database applications and backup applications, which for performance or other reasons typically bypass file system facilities and interface directly with secondary storage using the volume or logical device paradigm.

At 170, virtual volume (e.g., virtual volume 50) is presented to the service for storage of service data. The virtual volume is mapped by a translation table (e.g., table 70) to a physical volume (e.g., physical volume 52) of underlying physical data storage, the physical volume having a size expressed as a number of fixed-size data blocks. The translation table maps sets of ranges of duplicate data blocks of the virtual volume to corresponding individual ranges of shared data blocks of the physical volume, and the mapping is used to access ranges of the shared data blocks to complete service operations directed to corresponding ranges of the duplicate data blocks. Here the term "set" describes a particular instance of duplication. Thus if there are three ranges of blocks all identical to each other, and five ranges of blocks identical to each other but not to the first three, then the three blocks form one set and the five blocks form a second set. For each set, there is one range of shared data blocks of the physical volume.

At 172, a hash table (e.g., hash table 134) is used to track contents of the physical volume and identify newly written data as duplicate data, which is to be mapped by the translation table to corresponding shared data blocks of the physical volume. The hash table is indexed by a portion (e.g., LSB 144) of a fixed-size hash value (e.g., hash 140) calculated from newly written data blocks, and the table has a number of entries (e.g., entries 150) substantially less than the number of data blocks of the physical volume. In one embodiment, this ratio may be about $\frac{1}{1000}$ as described above. Each entry identifies an address alignment (e.g., offset 154) of the data block from which the entry was created. Use of the hash table includes (1) replacing existing entries with respective new entries for colliding data blocks having better address alignment, thereby promoting wider address-space separation of the entries. Collisions are described below. Use of the hash table further includes (2) upon occurrence of a hit in the hash table for a given data block in a range of newly written data blocks, comparing the data blocks of the range to corresponding physical volume data blocks in a range identified by the hit. This comparing extends or maximizes the size of the range or region that will be identified as duplicate in the translation table, promoting efficiency. Specific techniques of extension are described below.

Reference is again made to FIGS. 13 and 14 to describe the manner of managing the contents of the hash table 134, which is done by control action of the software-defined storage layer 22. New entries 150 are potentially added whenever a data block 118 is being written. Initially (e.g., at system startup) the hash table 134 is empty, so each write of a data block 118 that hashes to a distinct index 160 results in a new entry 150 for that block. Once the hash table 134 is non-empty, there is a possibility that a newly written data block 118 will hash to an existing entry 150. Such an occurrence is termed a "collision" herein, and such a newly written data block 118 is referred to as a "colliding" data block. A collision requires only that the LSB 144 of a new data block 118, taken as an index into the hash table 134, points to a location of an existing entry 150. The MSB 142 may or may not match the stored MSB value 152 for the entry 150.

Upon occurrence of a collision, an evaluation is performed to determine whether to replace the existing entry 150 with a new entry for the data block 118 being newly written. A value is calculated for each entry and the two values are compared. The new entry will replace an existing entry if it has higher value. In one embodiment, the evaluation includes factors for address alignment of the entry, age, and current usefulness as measured by the number of hits, i.e., the number of duplicates that have been detected based on the entry. This evaluation can be expressed in equation form as follows:

$$K1*hits+K2*lsb(\text{offset/block\_size})-msb(\text{current\_time-added\_time}),$$

where:
K1, K2 are constants selected to influence replacement behavior as desired;
"hits" for an entry 150 is the value in the hits field 158, and for the new data block is taken as 0;
"offset" is the data block address, which for the entry 150 is the value in the offset field 154;
"lsb" is a function returning the position of lowest-ordered bit equal to 1;
"current-time" is a running count incremented after a predetermined number of writes have occurred without replacing any entries 150 in the hash table 114;
"added-time" for the entry 150 is the value stored in the time field 156, and for the new data block is taken as the current-time; and
"msb" is a function returning the position of the highest-ordered bit equal to 1.

In the above equation, the first term captures current usefulness of an entry 150 by its number of hits, the second term captures address alignment (as a power-of-two multiple of a block size), and the third term captures the age of an entry 150. In one embodiment, values of K1=15 and K2=3 may be used. A candidate new entry is taken to have zero hits and zero age. Thus a candidate new entry will replace an existing entry if the address alignment of the candidate is better than the evaluation for the existing entry. The hit factor promotes retention of entries 150 that are useful in detecting duplicates, and the time factor ensures that entries 150 that become stale are replaced by new, fresher entries. As an existing entry 150 ages to the point that the first and third terms (hits and age) net out to about zero, then the existing entry 150 will be replaced by a candidate having better address alignment, i.e., address alignment at a higher power-of-two multiple of a block size. Thus, there is a tendency for better-aligned entries to replace worse-aligned entries over time. But even well-aligned entries eventually age out in favor of newer entries that in general are more useful in detecting duplicates going forward in time.

As mentioned, hits are verified by comparing actual data blocks. If a match is found, then there is a process of extending the range as far as possible. This uses a search that is continued to adjacent data blocks and checks for actual duplicates. An example is given below. Additionally, in the case of a series of writes to one contiguous range, if one write identifies duplicates, then for the next write the search continues from the point where the duplicates were last found. This is also described briefly below. The translation table 70 (FIG. 6) is kept up to date by storing entries 72 for ranges of duplicates discovered during verification. As the translation table 70 is updated, regions are also marked as DU, DS, DD etc. as appropriate.

Regarding the extension of the range as outlined above, this aspect of operation is important to achieve high effectiveness. It is desired to capture duplicates that appear only gradually (i.e., over some period longer than just the time span of a small number of writes) and also to capture duplication of large regions. As an example, suppose that the hash table 134 is populated with entries 150 having average alignment of 1 MB. This means that there is knowledge of one duplicate block per 1 MB of the storage on average. Now if the file system 20 or other service begins to write a 1-MB region block by block, it is desired to deduplicate the entire 1 MB block, notwithstanding that it is written block by block and perhaps starts at some intermediate location having no hash table entry.

One technique used to deduplicate larger ranges is to remember recent writes of duplicated blocks and extend deduplication ranges across when a duplicate is detected. The following example is used to illustrate. This example depicts data blocks of an area of a volume being written to with increasing logical block addresses from left to right. The result is that a single hash table entry for duplicated block D covers a range of blocks (a-f). This range is given a single entry 72 in the translation table 70.

| | |
|---|---|
| ****abcDefg*****************abc | nothing is found so far |
| ****abcDefg*****************abcD | now D matches and there is a scan left (preceding writes) to extend the range to a-D |
| ****abcDefg*****************abcDe | the last duplicate D is monitored, and the new page e is checked and added to range |
| ****abcDefg*****************abcDef | the last duplicate e is monitored, and the new page f is checked and added to range |

The above operation is enabled in part by use of the thread memory 112 (FIG. 12) storing for each thread the location of the last de-duplicated write and its $F_A$. These contents can be quickly checked against corresponding blocks within DS regions in order to extend the DS regions accordingly. Thus when a write at offset x occurs and x is the end of the last duplicate found in this thread (identified by an entry in the thread memory 112), then the data for this write is compared with the data present at x+last $F_A$ where last $F_A$ is from the last duplicate found for the current thread. If the data matches, confirming duplication, the existing DS range is extended.

The extending operation may scan both directions to handle the case where duplicate is written in reverse-sequential or random order.

There is the possibility that a write operation writes new data at the same address(es) as a prior write identified in the thread memory 112. In this case, such data blocks should no longer be treated as duplicate blocks. Thus, the comparison that is performed above may also further detect non-duplicate new data blocks in a range of data blocks, and such non-duplicate new data blocks are processed to create one or more new entries in the hash table distinct from the existing entry for the prior data. Referring to the above example, if block b is overwritten in this way, then the range for the entry D is modified to c-f, and a new entry B is created for the new data of block b. In this case, block a might no longer be covered by any entry, because its "range" a-a is too small to provide a useful level of deduplication.

As a practical matter, there is some minimum threshold for the size of a range, to promote efficiency. Any ranges smaller than the threshold size are not given entries in the translation table 70. An example of such a threshold is 64 data blocks. The exact threshold may vary in different embodiments.

Hash Table Synchronization

In operation the hash table 134 (FIGS. 13-14) is stored in volatile system memory (e.g., memory 32, FIG. 2) of each host 10 (FIG. 1). When the hosts 10 are members of a cluster as described above, they may have shared access to data stored in the storage devices 12 (FIG. 1), and thus there may be value in sharing contents of their respective hash tables 134 as well. Thus in this case, a single master hash table is maintained in persistent storage (e.g., storage 38, FIG. 2)), and periodic synchronization is used to effectively share hash table information between cluster members (hosts 10) accessing the same shared storage. For each host 10, synchronization merges better table entries in both directions, i.e., better entries in the host table replace existing entries in the master table, and vice-versa. This bidirectional propagation of better entries causes them to become shared across all hosts 10. For performance reasons, the table is divided into sections and synchronization is done one section at a time. Each section has information about its current time and when that time was last incremented. During synchronization, both the times in memory and disk tables are updated. After that each entry is evaluated and the one with greater evaluation is kept in both tables.

Another aspect of synchronization is the ability to identify duplicates written by different servers. When merging a host hash table with the persistent master table, the matching entries that are compared based on the value function may first be compared as hash values, and if a match is found then comparison and scanning of the actual stored data could take place to confirm duplication. In this way duplicates written from different servers can be discovered at this stage.

While various embodiments of the invention have been particularly shown and described, it will be understood by those skilled in the art that various changes in form and details may be made therein without departing from the scope of the invention as defined by the appended claims.

What is claimed is:

1. A method of operating a host computer in conjunction with a physical data storage system to provide deduplicated persistent data storage to a higher-level service of the host computer, comprising:

presenting a virtual volume to the service for storage of service data, the virtual volume being mapped by a translation table to a physical volume of the physical data storage system, the physical volume having a size expressed as a number of fixed-size data blocks, the translation table mapping sets of ranges of duplicate data blocks of the virtual volume to corresponding individual ranges of shared data blocks of the physical volume, the mapping being used to access ranges of the shared data blocks to complete service operations directed to corresponding ranges of the duplicate data blocks; and using a hash table to track contents of the physical volume and identify newly written data as duplicate data to be mapped by the translation table to corresponding shared data blocks of the physical volume, the hash table being indexed by a portion of a fixed-size hash value calculated from newly written data blocks and having a number of entries substantially less than the number of data blocks of the physical volume, each entry identifying an address alignment of the data block from which the entry was created, the use of the hash table including (1) replacing existing entries with respective new entries for colliding data blocks having address alignment at a higher power-of-two multiple of a block size to promote wider address-space separation of the entries, and (2) upon occurrence of a hit in the hash table for a given data block in a range of newly written data blocks, comparing the data blocks of the range to corresponding physical volume data blocks in a range identified by the hit and extending a corresponding region identified by the translation table as duplicate data to include matching ones of the data blocks to maximize a size of the corresponding region identified as duplicate data.

2. The method of claim 1, wherein the mapping is used to divide an I/O request into multiple sub-requests for corresponding sub-regions of data, the I/O request spanning distinct ranges of the virtual volume having respective distinct mappings to the physical volume, the I/O request being divided such that the sub-requests are directed to respective ones of the distinct ranges.

3. The method of claim 1, wherein the translation table includes entries for respective ranges, each entry having data distributed among a set of fields including a range field storing starting and ending addresses of the respective range, a type field storing a duplication type of the respective range, a reference count field storing a count of duplications of the respective range, and a mapping field storing a respective mapping between the virtual volume and the physical volume for the respective range, and wherein an entry is identified as being involved in an I/O request by comparing contents of the range field against starting and ending addresses of the I/O request, overlap indicating that the corresponding region is involved in the I/O request.

4. The method of claim 1, wherein regions of the virtual volume are identified as respective types including deduplication source (DS) regions, deduplicated (DD) regions, moved (DM) regions, and unknown (DU) regions, the DS regions containing original or first instance data, the DD regions (a) containing data for which identical data has been found in another region and (b) being translated and having respective freed physical-volume space assigned to extend a size of the virtual volume, the DM regions being translated, and the DU regions being untranslated regions.

5. The method of claim 4, further including region-type-dependent data writing operations including a DS region overwrite and a DD region overwrite, the DS region overwrite including (a) initially checking whether a DS region being written to has previously been translated, (b) if the DS region has not previously been translated, then identifying a free space region and translating the DS region to the free space region, and (c) if the DS region has previously been translated, then writing to the DS region without translating the DS region, the DD region overwrite including (a) identifying a free space region irrespective of a previous translation of the DD region, (b) translating the DD region to the free space region, and (c) changing the type of the DD region to DM.

6. The method of claim 1, further including, when a certain amount of duplicate data has been found and deduplicated, extending a size of the virtual volume by appending free regions corresponding to regions of the physical volume that are unused by virtue of deduplication of the duplicate data.

7. The method of claim 1, wherein the portion of the hash value that indexes the hash table is a first portion, and a remainder portion of the hash value is stored in a remainder portion field of each entry to provide full-width comparison of the hash value to the entries.

8. The method of claim 1, wherein a size of the hash table measured as number of entries is less than 1/100 a size of the physical volume measured in data blocks.

9. The method of claim 1, wherein the entries of the hash table have values used in an evaluation operation used to replace existing entries with new entries, the values including (1) a first value reflecting recent usefulness of the entries for detecting duplicates, (2) a second value reflecting address alignment of the entries, and (3) a third value reflecting aging of entries in the hash table, the evaluation operation including calculating and comparing respective evaluation values for the existing and new entries and replacing an existing entry with a new entry having a higher evaluation value.

10. The method of claim 9, wherein (1) the first value is a count of hits identifying duplicate data based on an entry, (2) the second value is an offset address for the data block corresponding to the entry, and (3) the third value is a time value incremented when a predetermined number of writes have not resulted in replacing entries of the hash table with new entries.

11. The method of claim 1, wherein, upon detection of a duplicate data block being written to the virtual volume, a process of extending a range of blocks including the duplicate data block is performed to maximize a size of the range for identification as a duplicate range, the process including (a) a search for adjacent duplicate data blocks for data blocks written immediately prior to the writing of the duplicate data block and not previously identified as duplicates based on the contents of the hash table, and (b) a comparison of subsequently written adjacent data blocks with corresponding existing data blocks to detect duplication without first using the hash table to identify potential hits.

12. The method of claim 11, wherein the comparison further results in detecting non-duplicate new data blocks, and processing the non-duplicate new data blocks to create one or more new entries in the hash table distinct from an existing entry for the duplicate data block.

13. The method of claim 1, wherein respective copies of the hash table are maintained in volatile memory and in persistent storage, and further including periodically synchronizing the two copies, the synchronizing including merging into both copies new entries having better evaluation according to an evaluation operation, the evaluation operation including factors for address alignment and age of the respective entries, the hash table being divided into sections and synchronization being performed one section at a time, synchronization including evaluating respective entries and keeping the entries with greater evaluation in both copies.

14. A host computer, comprising:
memory;
one or more processors coupled to the memory; and
input/output interface circuitry coupled to the memory and the one or more processors and used to couple the host computer to a physical data storage system,
wherein the memory stores computer program instructions which, when executed by the one or more processors, cause the one or more processors to realize a software-defined storage layer co-operating with the physical data storage system to provide deduplicated persistent data storage to a higher-level service of the host computer, by performing operations including:
presenting a virtual volume to the service for storage of service data, the virtual volume being mapped by a translation table to a physical volume of the physical data storage system, the physical volume having a size expressed as a number of fixed-size data blocks, the translation table mapping sets of ranges of duplicate data blocks of the virtual volume to corresponding individual ranges of shared data blocks of the physical volume, the mapping being used to access ranges of the shared data blocks to complete service operations directed to corresponding ranges of the duplicate data blocks; and
using a hash table to track contents of the physical volume and identify newly written data as duplicate data to be mapped by the translation table to corresponding shared data blocks of the physical volume, the hash table being indexed by a portion of a fixed-size hash value calculated from newly written data blocks and having a number of entries substantially less than the number of data blocks of the physical volume, each entry identifying an address alignment of the data block from which the entry was created, the use of the hash table including (1) replacing existing entries with respective new entries for colliding data blocks having address alignment at a higher power-of-two multiple of a block size to promote wider address-space separation of the entries, and (2) upon occurrence of a hit in the hash table for a given data block in a range of newly written data blocks, comparing the data blocks of the range to corresponding physical volume data blocks in a range identified by the hit and extending a corresponding region identified by the translation table as duplicate data to include matching ones of the data blocks to maximize a size of the corresponding region identified as duplicate data.

15. The host computer of claim 14, wherein the mapping is used to divide an I/O request into multiple sub-requests for corresponding sub-regions of data, the I/O request spanning distinct ranges of the virtual volume having respective distinct mappings to the physical volume, the I/O request being divided such that the sub-requests are directed to respective ones of the distinct ranges.

16. The host computer of claim 14, wherein the translation table includes entries for respective ranges, each entry having data distributed among a set of fields including a range field storing starting and ending addresses of the respective range, a type field storing a duplication type of the respective range, a reference count field storing a count of duplications of the respective range, and a mapping field storing a respective mapping between the virtual volume and the physical volume for the respective range, and wherein an entry is identified as being involved in an I/O request by comparing contents of the range field against starting and ending addresses of the I/O request, overlap indicating that the corresponding region is involved in the I/O request.

17. The host computer of claim 14, wherein regions of the virtual volume are identified as respective types including deduplication source (DS) regions, deduplicated (DD) regions, moved (DM) regions, and unknown (DU) regions, the DS regions containing original or first instance data, the DD regions (a) containing data for which identical data has been found in another region and (b) being translated and having respective freed physical-volume space assigned to extend a size of the virtual volume, the DM regions being translated, and the DU regions being untranslated regions.

18. The host computer of claim 17, wherein region-type-dependent data writing operations of the host computer include a DS region overwrite and a DD region overwrite, the DS region overwrite including (a) initially checking whether a DS region being written to has previously been translated, (b) if the DS region has not previously been translated, then identifying a free space region and translating the DS region to the free space region, and (c) if the DS region has previously been translated, then writing to the DS region without translating the DS region, the DD region overwrite including (a) identifying a free space region irrespective of previous translation of the DD region, (b) translating the DD region to the free space region, and (c) changing the type of the DD region to DM.

19. The host computer of claim 14, wherein when a certain amount of duplicate data has been found and deduplicated, a size of the virtual volume is extended by appending free regions corresponding to regions of the physical volume that are unused by virtue of deduplication of the duplicate data.

20. The host computer of claim 14, wherein the portion of the hash value that indexes the hash table is a first portion, and a remainder portion of the hash value is stored in a remainder portion field of each entry to provide full-width comparison of the hash value to the entries.

21. The host computer of claim 14, wherein a size of the hash table measured as number of entries is less than $1/100$ a size of the physical volume measured in data blocks.

22. The host computer of claim 14, wherein the entries of the hash table have values used in an evaluation operation used to replace existing entries with new entries, the values including (1) a first value reflecting recent usefulness of the entries for detecting duplicates, (2) a second value reflecting address alignment of the entries, and (3) a third value reflecting aging of entries in the hash table, the evaluation operation including calculating and comparing respective evaluation values for the existing and new entries and replacing an existing entry with a new entry having a higher evaluation value.

23. The host computer of claim 22, wherein (1) the first value is a count of hits identifying duplicate data based on an entry, (2) the second value is an offset address for the data block corresponding to the entry, and (3) the third value is a time value incremented when a predetermined number of writes have not resulted in replacing entries of the hash table with new entries.

24. The host computer of claim 14, wherein the memory further stores instructions causing the host computer, upon detection of a duplicate data block being written to the virtual volume, to extend a range of blocks including the duplicate data block to maximize a size of the range for identification as a duplicate range, the extending of the range of blocks including: (a) a searching for adjacent duplicate data blocks for data blocks written immediately prior to the writing of the duplicate data block and not previously identified as duplicates based on the contents of the hash table, and (b) comparing subsequently written adjacent data blocks with corresponding existing data blocks to detect duplication without first using the hash table to identify potential hits.

25. The host computer of claim 24, wherein the comparing subsequently written adjacent data blocks further results in detecting non-duplicate new data blocks and processing the non-duplicate new data blocks to create one or more new entries in the hash table distinct from an existing entry for the duplicate data block.

26. The host computer of claim 14, wherein respective copies of the hash table are maintained in volatile memory and in persistent storage, and the memory further stores instructions for periodically synchronizing the two copies, the synchronizing including merging into both copies new entries having better evaluation according to an evaluation operation, the evaluation operation including factors for address alignment and age of the respective entries, the hash table being divided into sections and synchronization being performed one section at a time, synchronization including evaluating respective entries and keeping the entries with greater evaluation in both copies.

27. A non-transitory computer-readable storage medium storing computer program instructions executable by a host computer to cause the host computer to operate in conjunction with a physical data storage system to provide deduplicated persistent data storage to a higher-level service of the host computer, by:
presenting a virtual volume to the service for storage of service data, the virtual volume being mapped by a translation table to a physical volume of the physical data storage system, the physical volume having a size expressed as a number of fixed-size data blocks, the translation table mapping sets of ranges of duplicate data blocks of the virtual volume to corresponding individual ranges of shared data blocks of the physical volume, the mapping being used to access ranges of the shared data blocks to complete service operations directed to corresponding ranges of the duplicate data blocks; and
using a hash table to track contents of the physical volume and identify newly written data as duplicate data to be mapped by the translation table to corresponding shared data blocks of the physical volume, the hash table being indexed by a portion of a fixed-size hash value calculated from newly written data blocks and having a number of entries substantially less than the number of data blocks of the physical volume, each entry identifying an address alignment of the data block from which the entry was created, the use of the hash table including (1) replacing existing entries with respective new entries for colliding data blocks having address alignment at a higher power-of-two multiple of a block size to promote wider address-space separation of the entries, and (2) upon occurrence of a hit in the hash table for a given data block in a range of newly written data blocks, comparing the data blocks of the range to corresponding physical-volume data blocks in a range identified by the hit and extending a corresponding region identified by the translation table as duplicate data to include matching ones of the data blocks to maximize a size of the corresponding region identified as duplicate data.

* * * * *